(12) United States Patent
Milanowski et al.

(10) Patent No.: US 6,743,980 B2
(45) Date of Patent: Jun. 1, 2004

(54) SEALING GASKET FOR CABLES

(75) Inventors: Michel Milanowski, Anserville (FR); Alain Vincent, Jully (FR)

(73) Assignee: Nexans, Paris (FR)

( * ) Notice: Subject to any disclaimer, the term of this patent is extended or adjusted under 35 U.S.C. 154(b) by 0 days.

(21) Appl. No.: 10/119,745

(22) Filed: Apr. 11, 2002

(65) Prior Publication Data

US 2002/0149157 A1 Oct. 17, 2002

(30) Foreign Application Priority Data

Apr. 12, 2001 (FR) .............................. 01 05047

(51) Int. Cl.$^7$ .............................. H02G 15/00; F16L 5/02
(52) U.S. Cl. .................. 174/65 R; 174/65 G; 174/135; 174/152 R; 16/2.1; 277/607
(58) Field of Search .................... 174/65 SS, 65 G, 174/22 R, 53 R, 31 R, 50, 65 R, 151, 152 R, 153 G, 100, 23 R, 17 CT, 135, 152 G; 248/56; 16/2.1, 2.2; 277/607

(56) References Cited

U.S. PATENT DOCUMENTS

| | | | | |
|---|---|---|---|---|
| 3,744,008 A | * | 7/1973 | Castellani | 174/65 SS |
| 4,030,741 A | * | 6/1977 | Fidrych | 174/65 SS |
| 4,379,204 A | * | 4/1983 | Perrault et al. | 174/65 SS |
| 4,386,817 A | * | 6/1983 | Benker et al. | 174/65 G |
| 4,549,037 A | * | 10/1985 | Bawa et al. | 174/65 SS |
| 4,692,561 A | * | 9/1987 | Nattel | 174/65 SS |
| 5,331,114 A | | 7/1994 | Rudolph | |
| 5,422,436 A | * | 6/1995 | Zachrai | 174/65 R |
| 5,504,276 A | | 4/1996 | Kunze | |
| 5,540,450 A | * | 7/1996 | Hayashi et al. | 174/152 G |
| 5,701,634 A | * | 12/1997 | Uemura et al. | 16/2.1 |
| 5,811,728 A | * | 9/1998 | Maeda | 16/2.2 |
| 5,866,853 A | * | 2/1999 | Sheehan | 174/153 R |
| 5,920,035 A | * | 7/1999 | Haney et al. | 174/153 G |
| 6,101,674 A | * | 8/2000 | Furuya et al. | 174/153 G |
| 6,268,565 B1 | * | 7/2001 | Daoud | 174/65 R |
| 6,294,734 B1 | * | 9/2001 | Daoud | 174/152 G |
| 6,323,433 B1 | * | 11/2001 | Mahaney et al. | 174/152 G |
| 6,348,657 B1 | * | 2/2002 | Haslock et al. | 16/2.1 |
| 6,353,184 B1 | * | 3/2002 | Daoud | 177/151 |
| 6,362,427 B1 | * | 3/2002 | Daoud | 174/152 G |
| 6,395,986 B1 | * | 5/2002 | Gust et al. | 16/2.1 |
| 6,443,457 B1 | * | 9/2002 | Daoud | 174/65 R |

FOREIGN PATENT DOCUMENTS

| | | |
|---|---|---|
| EP | 0 029 571 A1 | 6/1981 |
| EP | 0 638 975 A1 | 2/1995 |
| FR | 2 728 080 A1 | 6/1996 |

* cited by examiner

Primary Examiner—Dean Reichard
Assistant Examiner—Angel R. Estrada
(74) Attorney, Agent, or Firm—Sughrue Mion, PLLC

(57) ABSTRACT

A sealing gasket for cables, in particular optical or electrical telecommunications cables, for mounting in an inlet of a sealed box for protecting splices and containing a gas under pressure, is provided. The gasket is mounted in a tubular passage secured to the box and includes at least one tubular cylindrical portion of constant diameter having an inner sealing portion connected thereto to bear against the periphery of the cable and to be placed towards the inside of the box. The inner sealing portion is constituted by a tubular frustoconical portion connected to the end of the cylindrical portion and whose smaller diameter end presents an orifice of diameter smaller than the diameter of the cables to be mounted.

7 Claims, 2 Drawing Sheets

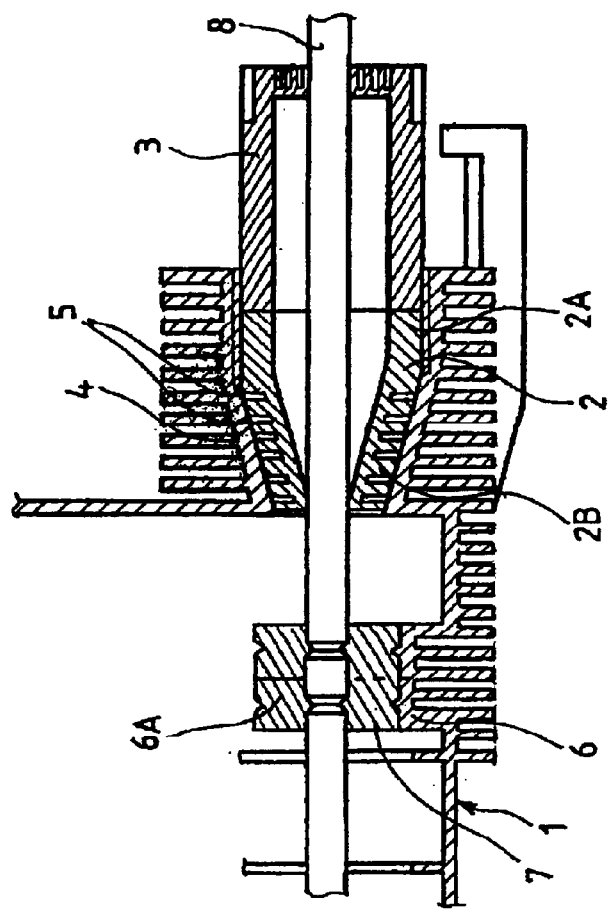
FIG_1
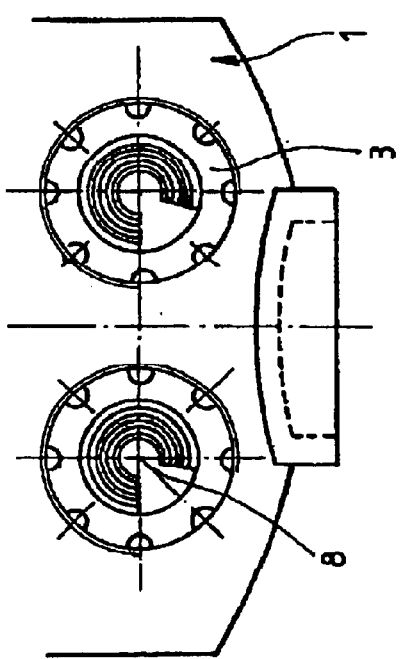
FIG_2

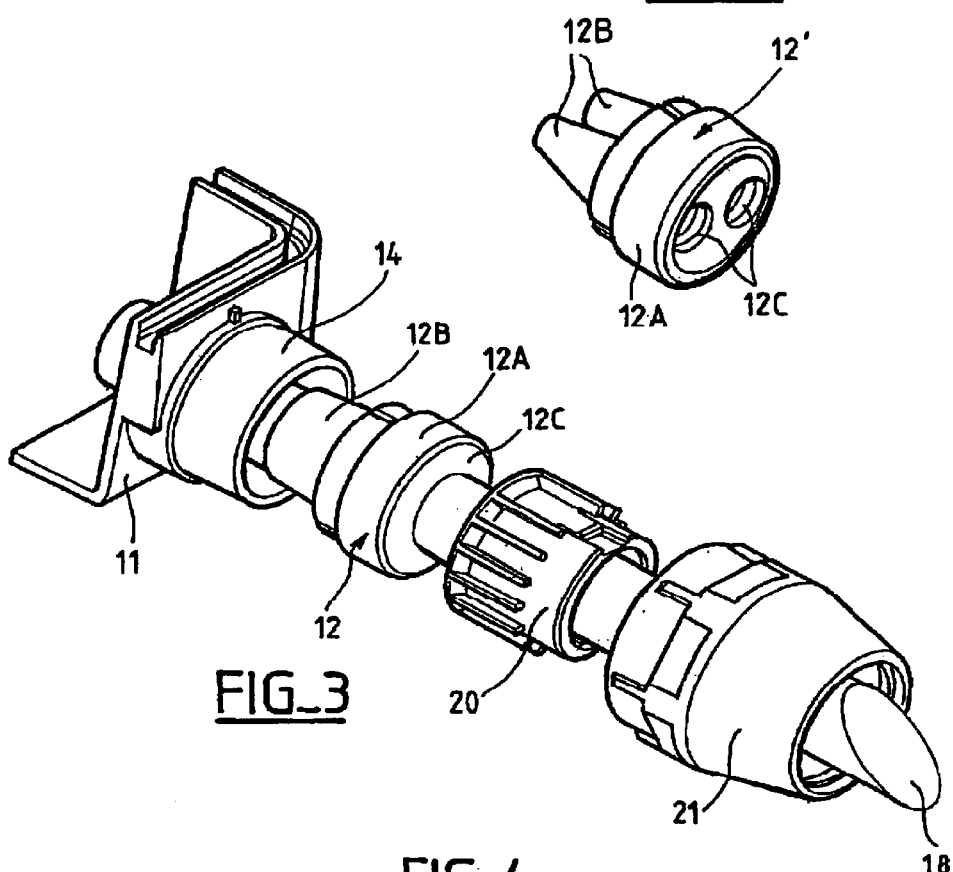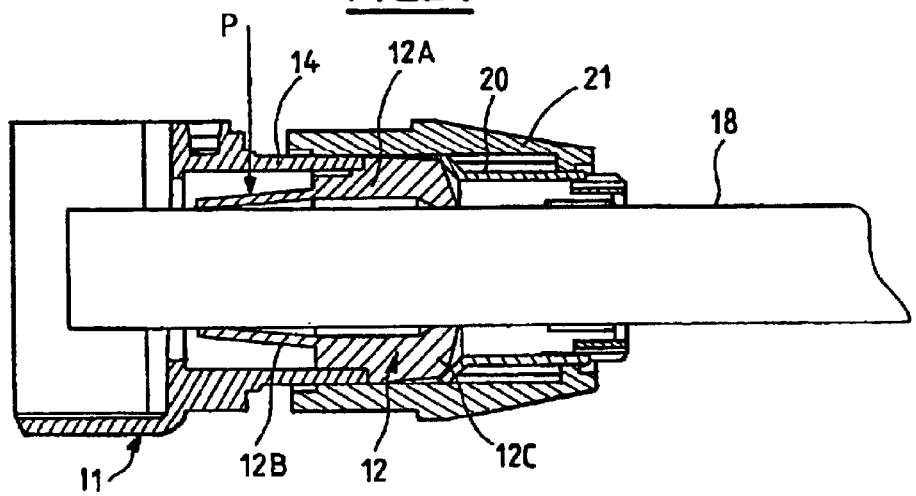

SEALING GASKET FOR CABLES

The present invention relates to a sealing gasket for cables, in particular for electrical or optical telecommunications cables.

More precisely, the invention relates to a sealing gasket for cables, in particular optical or electrical telecommunications cables, for mounting in an inlet of a sealed box for protecting splices and containing a gas under pressure, the gasket being mounted in a tubular passage secured to the box and comprising at least one tubular cylindrical portion of constant diameter having an inner sealing portion connected thereto to bear against the periphery of the cable and to be placed towards the inside of said box.

BACKGROUND OF THE INVENTION

Such a sealing gasket device is known from patent document DE-U-782 425. In that document, a gasket is mounted in conventional manner on a box, and more precisely on a support tube mounted on the box, and it is clamped by a nut or packing member screwed onto said tube and compressing it against the cable. That gasket has an outer frustoconical portion terminating in a sealing lip which is pressed against the periphery of the cable by the screwed-on nut. The gasket also has flexible inner sealing lips placed towards the inside of the box and bearing against the cable by elastic deformation.

The inner lips perform a sealing function in addition to that of the outer lip, and they are not capable on their own of providing effective sealing, given the pressure of the gas that exists inside the box.

OBJECT AND SUMMARY OF THE INVENTION

The object of the invention is to provide an inner sealing portion which provides full sealing on its own, i.e. which does not need to be associated with an outer lip in order to provide a gasket that is effectively sealed.

To do this, according to the invention, the inner sealing portion is constituted by a tubular frustoconical portion connected to the end of said cylindrical portion and whose smaller diameter end presents an orifice of diameter smaller than the diameter of the cables to be mounted.

This arrangement presents the advantage of the gasket being reusable after the sealing assembly has been dismantled.

Furthermore, in the above-cited prior art, the inside diameter of the outer sealing lip is smaller than the outside diameter of the cable in order to apply pressure around the cable once the nut has been tightened. That gasket is therefore designed for cables of a particular diameter. In other words, each cable diameter corresponds to a particular type of gasket having dimensions that match those of the cable.

Advantageously, the invention makes it possible to use standard gaskets, a single gasket being manufactured and being suitable for mounting on a range of cables of different diameters.

In a preferred embodiment, the inner sealing portion is constituted by a tubular frustoconical portion whose smaller diameter end has an orifice of diameter smaller than the minimum diameter of cables to be mounted.

A standard gasket can be manufactured, with its end being cut to the desired inside diameter prior to being mounted on the cable, the cut diameter being slightly smaller than the diameter of the cable so as to provide good sealing pressure against the periphery of the cable.

Preferably, said frustoconical portion is provided on its outer face with annular cutting grooves that are regularly spaced apart.

These grooves make it easier to cut the gasket to the desired diameter, which is slightly smaller than the diameter of the cable which is to be mounted.

In a variant, said cylindrical portion is terminated by an outer sealing lip opposite from said frustoconical portion.

This more complex variant has the advantage of presenting better sealing ability, by combining inner sealing with outer sealing. In addition, given that in this variant the cable is supported by two spaced-apart peripheral contacts with the gasket, one inner contact and one outer contact, the gasket is not damaged by any bending of the cable. This is particularly important when a plurality of cables are being mounted using a single gasket having a plurality of bores. Under such circumstances, during mounting, the cables are subjected to bending caused by elements of the sealing assembly being turned.

The invention also provides a sealing assembly for cables, in particular for electrical or optical telecommunications cables, for mounting at the inlet of a sealed box for protecting splices and containing a gas under pressure.

In a first variant, the gasket mounted in said tubular passage with its inner sealing portion disposed towards the inside of the box is held in position by an outer cylindrical plug screwed onto the tubular passage and holding said gasket longitudinally.

In a second variant, the gasket mounted in said tubular passage with its inner sealing portion disposed towards the inside of the box has its outer sealing lip thrust peripherally against the cable by a cable-guide, itself thrust in the longitudinal direction by a nut or packing member screwed onto the tubular passage.

BRIEF DESCRIPTION OF THE DRAWINGS

The invention is described in greater detail below with reference to the accompanying figures which show two preferred embodiments of the invention.

FIG. 1 is a longitudinal section view of the sealing assembly comprising a sealing gasket constituting a first embodiment of the invention.

FIG. 2 is a front view of the sealing assembly.

FIG. 3 is an exploded perspective view of the sealing assembly including a sealing gasket constituting a second embodiment of the invention.

FIG. 4 is a longitudinal section view of the sealing assembly.

FIG. 5 is a perspective view of a gasket in accordance with the invention.

MORE DETAILED DESCRIPTION

FIGS. 1 to 4 show sealing assemblies for cables, in particular electrical or optical cables for telecommunications, for mounting at the inlet of a leaktight box 1 for protecting splices and containing a gas under pressure. With optical cables, the gas can be air.

In the embodiment shown in FIGS. 1 and 2, the box has two identical cable inlets 8 provided side-by-side through a front face of the body 1 of the box. The box is not described in detail herein, and by way of example it can be a splice box of the type described in French patent document No. 2 728 080. Each of the inputs defines a tubular passage 4 that is completely close at its periphery and that is secured to the box 1, the inside face of the passage being cylindrical and tapered. It receives a gasket 2 with its inner sealing portion 2B placed towards the inside of the box 1 and of a shape corresponding thereto, and an outer cylindrical plug 3 screwed onto the passage 4 into its tapered portion, and holding said gasket 2 longitudinally.

The gasket 2 is constituted by a tubular frustoconical portion, of substantially constant thickness, forming said sealing portion 2B and connected to and extending the end of a tubular cylindrical portion 2A of constant diameter.

It is suitable for being cut so that the smaller diameter end of the frustoconical portion can be of a diameter that is slightly smaller than the diameter of the cable 8 for mounting in the gasket. Advantageously, for this purpose, it presents a series of annular cutting grooves 5 that are regularly spaced apart along its sealing portion (frustoconical portion) 2B.

Thus, the standard gasket 2 (before being cut) comprises an inner sealing portion 2B for bearing against the cable 8 and for being placed towards the inside of said box 1. This inner sealing portion 2B is constituted by a frustoconical portion whose smaller diameter end presents an orifice of diameter smaller than the minimum diameter of the cables 8 that are to be mounted and which is designed to the mounted towards the inside of the box 1.

The cable 8 is threaded by force through the cut-to-size gasket that has already been put into place. The gasket material that is displaced while the cable 8 is being inserted therein serves to seal the cable in the inlet. The plug 3 holds the gasket 2 in place in the passage 4. The cable is then docked to a body partition 6 of the box in register with said inlet by means of a docking ring 7 that is a locked in the partition 6 by a docking clamp 6A.

In another variant shown in FIGS. 3 and 4, the box 11 has a cable inlet 18 through a front face of the body 11 of the box. The inlet defines a tubular passage 14 that is completely closed around its periphery, that is secured to the box 11, and that has an outside face which is cylindrical and threaded. It receives a gasket 12 with its inner sealing portion 12B placed towards the inside the box 11, together with a conventional arrangement comprising a cable-guide 20 and a nut or packing member 21 screwed onto the passage 14 via its threaded portion.

The gasket 12 is constituted by a tubular frustoconical portion of substantially constant thickness forming said sealing portion 12B and connected to a tubular cylindrical portion 12A of constant diameter which is in turn terminated by an outer sealing lip 12C opposite from said frustoconical portion 12B.

The gasket 12 mounted in said passage 14 with its inner sealing portion 12B directed towards the inside of the box 11 has its outer sealing lip 12C pressed against the cable 18 by the cable-guide 20, itself thrust in the longitudinal direction by the nut or packing member 21 screwed onto the passage 14.

FIG. 5 shows a two-bore gasket 12' in accordance with invention and comprising two tubular frustoconical portions 12B for passing two cables. Apart from this difference, the structure of the gasket 12' identical to that of the preceding gasket.

In addition to pressing on the cable by being cut to a diameter slightly smaller than the diameter of the cable to be mounted, the frustoconical portions 12B also benefit from the pressure P (see FIG. 4) of the gas contained inside the box pressing against the radial faces thereof, and thus provide excellent sealing. Sealing therefore increases in proportion to the pressure P of the gas.

The gasket is made of a soft material, for example of silicone rubber.

In the first embodiment shown in FIGS. 1 and 2, the inner sealing frustoconical portion 2B is identical in thickness to the cylindrical portion 2A and is therefore relatively thick. Sealing is then achieved by deforming the material of the end of this inner sealing frustoconical portion 2B which is crushed against the periphery of the cable.

In the second embodiment shown in FIGS. 3 and 4, the inner sealing frustoconical portion 12B is of smaller thickness than the cylindrical portion 12A and is relatively thin. Sealing is achieved by deforming the material of the end of this frustoconical portion as before, and also by elastically deforming the portion 12B towards the cable, which deformation is proportional to the pressure P which presses the portion 12B against the cable.

What is claimed is:

1. A single, standard sealing gasket for a plurality of cables having different sized diameters, in particular optical or electrical telecommunications cables, for mounting in an inlet of a sealed box for protecting splices and containing a gas under pressure, the gasket being mounted in a tubular passage secured to the box and comprising:

at least one tubular cylindrical portion of constant diameter; and an inner sealing portion, connected to said at least one tubular cylindrical portion, for bearing against a periphery of one of the plurality of cables, and placed towards an inside of said box, wherein said inner sealing portion is constituted by a tubular frustoconical portion connected to an end of said cylindrical portion and whose smaller diameter end has an orifice of diameter smaller than a minimum diameter of the plurality of cables to be mounted, this inner sealing portion being cut at the end which is to be placed towards the inside of the box, so that the cut end has a diameter which is slightly smaller than the diameter of the cable to be mounted.

2. A gasket according to claim 1, wherein said at least one tubular cylindrical portion is terminated by an outer sealing lip opposite from said frustoconical portion.

3. A sealing assembly for cables, in particular for electrical or optical telecommunications cables, for mounting at the inlet of a sealed box for protecting splices and containing a gas under pressure, the assembly including a gasket according to claim 2, wherein the gasket mounted in said tubular passage with its inner sealing portion disposed towards the inside of the box has its outer sealing lip thrust peripherally against the cable by a cable-guide, itself thrust in a longitudinal direction by a nut or packing member screwed onto the tubular passage.

4. A sealing assembly for cables, in particular for electrical or optical telecommunications cables, for mounting at the inlet of a sealed box for protecting splices and containing a gas under pressure, the assembly including a gasket according to claim 1, wherein the gasket mounted in said tubular passage with its inner sealing portion disposed towards the inside of the box is held in position by an outer cylindrical plug screwed onto the tubular passage and holding said gasket longitudinally.

5. A sealing gasket for cables, in particular optical or electrical telecommunications cables, for mounting in an inlet of a sealed box for protecting splices and containing a gas under pressure, the gasket being mounted in a tubular passage secured to the box and comprising:

at least one tubular cylindrical portion of constant diameter having an inner sealing portion connected thereto to bear against a periphery of the cable and to be placed towards an inside of said box, wherein said inner sealing portion is constituted by a tubular frustoconical portion connected to an end of said cylindrical portion and whose smaller diameter end has an orifice of diameter smaller than a minimum diameter of the cables to be mounted, wherein said frustoconical portion is provided on its outer face with annular cutting grooves that are regularly spaced apart.

6. A method of assembling a single sealing gasket capable of mounting a plurality of different sized cables having different diameters, to a sealed box for protecting splices and containing a gas under pressure, the sealing gasket including a tubular cylindrical portion of constant diameter and a tubular frustoconical portion connected by a first end to the tubular cylindrical portion, wherein a second end of the frustoconical portion has an inner diameter smaller than the smallest diameter of the plurality of different sized cables, comprising:

providing one of the plurality of different sized cables to be mounted to the sealed box;

cutting the second end of the frustoconical portion to be smaller than the diameter of the one of the plurality of different sized cables to be mounted; and mounting the one of the plurality of different sized cables to the sealing gasket.

7. A sealing gasket comprising:

at least one cylindrical portion having a constant diameter;

an inner sealing portion, connected to said at least one tubular cylindrical portion, said inner sealing portion comprising a tubular frustoconical portion connected to an end of said cylindrical portion, the smaller diameter end of the tubular frustoconical portion comprising a series of annular cutting grooves operable to permit the smaller diameter end to be cut to a size slighly smaller than a diameter of a cable to be mounted through the sealing gasket.

* * * * *